United States Patent

Iwagaki et al.

[11] Patent Number: 5,998,001
[45] Date of Patent: Dec. 7, 1999

[54] MAGNETIC RECORDING MEDIUM

[75] Inventors: Masaru Iwagaki; Kimio Ozawa, both of Hino, Japan

[73] Assignee: Konica Corporation, Japan

[21] Appl. No.: 08/786,044

[22] Filed: Jan. 21, 1997

[30] Foreign Application Priority Data

Jan. 25, 1996 [JP] Japan .................................. 8-011118

[51] Int. Cl.⁶ ...................................................... G11B 5/66
[52] U.S. Cl. ......................... 428/212; 428/213; 428/329; 428/336; 428/340; 428/694 BM; 428/694 BH; 428/694 BB; 428/900; 354/76; 354/105; 430/140; 430/496; 430/523
[58] Field of Search ................... 428/694 BM, 694 BH, 428/694 BB, 212, 213, 329, 336, 340, 900; 354/76, 105; 430/140, 496, 523

[56] References Cited

U.S. PATENT DOCUMENTS

| 5,229,259 | 7/1993 | Yokota | 430/523 |
| 5,294,525 | 3/1994 | Yamauchi | 430/523 |
| 5,318,826 | 6/1994 | Yasufuku | 428/212 |
| 5,382,494 | 1/1995 | Kudo | 430/140 |
| 5,459,021 | 10/1995 | Ito | 430/527 |
| 5,707,791 | 1/1998 | Ito | 430/531 |

*Primary Examiner*—Leszek Kiliman
*Attorney, Agent, or Firm*—Jordan B. Bierman; Bierman, Muserlian and Lucas

[57] ABSTRACT

A magnetic recording medium is disclosed, comprising a support having on side thereof a magnetic recording layer and on the other side, photographic component layers including a silver halide emulsion layer, wherein a contact angle between water and a surface of the side having the magnetic recording layer is from 85° to 100°.

8 Claims, No Drawings

MAGNETIC RECORDING MEDIUM

FIELD OF THE INVENTION

The present invention relates to a magnetic recording medium. To be more specific, the invention relates to a magnetic recording medium and a method of manufacturing the same, whereby clogging of the magnetic head can effectively be prevented.

BACKGROUND OF THE INVENTION

A magnetic recording medium is a means for reading and writing information with a magnetic head. In order for information to be promptly and correctly inputted or outputted, it is necessary that the magnetic recording medium and the magnetic head are always in optimal operating conditions. However, due to contact with the magnetic metal head and the surface of the magnetic recording medium, which is comprised of a synthetic polymer binder and, dispersed thereon are magnetic particles such as iron oxide as the main constituent, adhesion or clogging, by dust, dirt or the constituent of the magnetic recording medium itself, etc., on the surface or between the gap of the magnetic head takes place, often interfering with the data input and output operations.

Most of these problems can be solved by regular cleaning of the magnetic head, however, although cleaning may be effective for dust, it has still not been perfected to counter the adhesion of the constituent of the magnetic recording medium. Moreover, the inconvenience of preparation of the cleaning member and the cleaning operation itself still exist.

Recently, in the field of silver halide light-sensitive color photographic materials, which, in the followings are simply referred to as "light-sensitive material", there is a proposal that, in order to effectively utilize information concerning exposure at the time of development or printing on photographic paper, such information regarding on the photographing, etc. be recorded on the silver halide light-sensitive color photographic material and using such data in the subsequent processing operations.

In U.S. Pat. No. 4,947,196 and International Patent O.P.I. Publication No. 90/04254 are disclosed a roll film having on the back-side a magnetic layer comprised of magnetic particles capable of magnetic recording, and a camera comprising a magnetic head. In accordance to the above improved technology, it has become possible to increase efficiency in the enhancement of printing quality, printing operations and clerical details in the lab, etc.

That is to say, this can be said to be an epoch-making recording medium provided on one side with a magnetic recording layer and on the other side, with photographic components layers, and having in a combination of magnetic information and optical information.

However, the problem of the above-mentioned clogging of the magnetic head still remains and, in addition, new factors relating to clogging caused by photographic constituent layers and the process thereof arise. It is rather difficult to cope with this problem only by conventionally cleaning means and further, countermeasures, such as increasing the amount of polishing agent in the magnetic recording medium, are not desirable because of deterioration of magnetic properties and trafficability. Therefore, fundamental breakthroughs in this respect have been demanded.

SUMMARY OF THE INVENTION

Accordingly, one objective of the present invention is to provide a magnetic recording medium and a method of manufacturing the same, whereby clogging between the gap of the magnetic head can be effectively prevented without causing deterioration of magnetic properties and trafficability. Another objective of the present invention is to provide a magnetic recording medium and a method of manufacturing the same, whereby clogging between the gap of the magnetic head is effectively prevented even for a magnetic recording medium with several photographic component layers.

The above-mentioned objectives can be achieved by one of the following constitution given below:

1. A magnetic recording medium comprising a support having on one side thereof a magnetic recording layer containing a magnetic powder and on the other side photographic component layers including a silver halide emulsiin layer, characterized in that a contact angle between water and a surface of the side having the magnetic recording layer is from 85° to 100°.

2. The magnetic recording medium of above-described 1, wherein the surface of the side having the magnetic recording layer has a wax layer, the magnetic recording layer comprising acetyl cellulose having an acetyl value is not smaller than 1.8 and not greater than 2.3.

3. The magnetic recording medium of above-described 1 or 2, wherein said wax is a carnabau wax in an amount of 12 to 20 mg/m$^2$.

4. The magnetic recording medium of above-described 1, wherein said magnetic recording layer contains non-magnetic metal oxide particles in an amount of 2 to 30 mg/m$^2$.

5. The magnetic recording medium of the above-mentioned 4, wherein said non-magnetic metal oxide particles are localized in the vicinity of the surface of said magnetic recording layer.

6. The magnetic recording medium of the above-mentioned 5, wherein said non-magnetic metal oxide particles are localized, in an amount of 2 to 30 mg/m$^2$, in the vicinity of the surface of said magnetic recording layer.

7. The magnetic recording medium of above-described 5 or 6, wherein at least 40% of said non-magnetic metal oxide particles is localized within 30%, in depth from the surface, of the total thickness of the magnetic layer.

8. A method of manufacturing a magnetic recording medium, characterized in that non-magnetic metal oxide particles are localized in the vicinity of the surface of the magnetic recording layer by coating a magnetic recording layer containing the non-magnetic metal oxide particles, followed by rapid-drying thereof.

9. The method of manufacturing the magnetic recording medium of above-described 8, wherein the method is characterized in comprising a step of completing said rapid drying of the magnetic recording layer is completed within 15 seconds after coating.

10. The method of manufacturing the magnetic recording medium of described 8, wherein a magnetic powder and non-magnetic metal oxide particles are each separately dispersed and mixed with each other to prepare a coating solution for the magnetic recording layer.

11. The method of manufacturing the magnetic recording medium of above-described 8, wherein a binder of the magnetic recording layer is hardened with an isocyanate compound in an amount of 15 to 30% by weight of the binder.

12. The method of manufacturing the magnetic recording medium of above-described 11, wherein said isocyanate compound is incorporated by in-line addition.

DETAILED DESCRIPTION OF THE INVENTION

In the present invention, the contact angle of water on the surface of the side having the magnetic recording layer is 85° to 100°. Herein the term "contact angle" is referred to as an angle between the surface of water and the surface of the magnetic recording layer at the line of contact. It is concerned with physical properties of the surface, as disclosed on "Shin Jikken Kagaku Koza" (New Series of Experimental Chemistry) Vol. 18, pages 93–106, published by Maruzen Publishing Co. In the invention, the contact angle can be determined by a known method. Thus, using a microsyringe, a drop of water of 5 µl was put on the surface of a sample at 23° C. and 55% R.H. and after 20 sec., an angle of contact of the drop was measured by using an apparatus for measuring a contact angle produced by ERMA Inc. The measurement was repeated at least three times and measured values were averaged. Surprisingly, it was found that clogging between the gap of the magnetic head can be markedly reduced by setting the contact angle within a specific range. The contact angle of the magnetic recording medium heretofore known in the art are less than that specified in the present invention and, accordingly, the concept of the present invention has not been disclosed nor suggested.

There are various ways to attain the contact angle specified in the present invention. For example, the surface of the magnetic recording layer has a wax layer; the wax consists of an higher fatty acid ester-type wax; the wax is dissolved in a mixed solvent of water/alcohol and then coated; and the magnetic recording layer comprises acetyl cellulose as a binder.

It is preferable that said higher fatty acid is carnauba wax and the amount of said higher fatty acid wax is 12 to 20 mg/m$^2$. When the amount is less than 12 mg/m$^2$, effects of the present invention is slight and, on the other hand, when the amount is greater than 20 mg/m$^2$, it is not preferable because occurrence of drop-out may be observed and running performance may adversely be affected. The alcohol used as a solvent is preferably one having a boiling point of 160° C. or lower. Examples thereof include methanol, ethanol, n-propanol, isopropanol, n-butanol, isobutanol, tert-butanol, etc. In addition, an ether or ester of glycol, such as ethylene glycol monomethyl ether and propylene glycol monomethylether may be usable.

Further, it is preferable that the acetyl cellulose has an acetyl value of 1.8 to 2.3. As is well-known in the art, the acetyl value of the acetyl cellulose a value indicating the amount of acetic acid which is bonded to the cellulose, in the form of an ester. Thus, it represents the number of the acetylated hydroxy group per a glucose unit of the cellulose. The acetyl value can be determined by the method known in the art. When the acetyl value is too small or too large, a high contact angle as specified in the present invention can not be attained. It has not been expected that such characteristics of a synthetic polymer constituting the binder have an effect on the contact angle and, as the result, the clogging of the gap in the magnetic recording head is reduced.

Another means to reduce clogging of the magnetic head according to the present invention is that non-magnetic metal oxide particles are incorporated in the magnetic recording layer. That is to say, the magnetic recording medium having the advantages of the present invention can be achieved by incorporation of the non-magnetic metal oxide particles, in an amount of 2 to 30 mg per m$^2$ of the magnetic recording medium, preferably, 4 to 24 mg/m$^2$ and, more preferably 6 to 20 mg/m$^2$. Particularly, the effect of the present invention can markedly be achieved by localizing the non-magnetic metal oxide particles in the vicinity of the surface of the magnetic recording layer. It is preferable that 40% or more of the non-magnetic metal oxide particles are present within a depth (from the surface) of 30% of the total thickness of the magnetic layer.

Herein, the term "the surface of the magnetic recording layer" is referred to as that of the opposite side of the magnetic recording layer to the support-side, thus, this is the side which brings into contact with the magnetic head. In other words, according to a preferable embodiment of the present invention, the non-magnetic metal oxide particles in the magnetic recording layer are localized on the side of the magnetic head. The non-magnetic metal oxide particles also function as a polishing agent in the magnetic recording medium and, even when incorporated in a small amount, it is localized and works effectively and, in addition, it is an excellent ingredient in order to prevent clogging of the magnetic head.

Such localization may be achieved by coating two or more magnetic recording layers having different contents of the non-magnetic metal oxide particles. This can also be achieved by adjusting drying conditions after coating the solution for the magnetic recording layer.

It is preferable in the present invention to localize the non-magnetic metal oxide particles in the vicinity of the magnetic recording layer by rapid drying. It is also simple, in the manufacture thereof. As conditions for such rapid drying, it is preferred to complete the drying within 15 seconds after coating a coating solution of the magnetic recording layer and, more preferably, within 5 to 12 seconds. When it is completed within shorter than 5 seconds, uneven drying or wrinkling take place and are, therefore, not preferable. When, on the other hand, drying is conducted in 15 seconds or longer, then, localization will be insufficient. Furthermore preferably, immediately after coating, the coated layer is subjected to drying by hot air at a temperature 50° C. or more and 30% R.H. or less for a period of 4 to 10 seconds, and, then further to drying at 100° C. or higher for 1 to 5 seconds.

In the present invention, still another means for reducing clogging of the magnetic head concerns preparation of the coating solution for the magnetic recording layer. Generally, after a magnetic powder and metal oxide particles are mixed, the mixture is dispersed physically or mechanically. However, it was found that the objectives of the present invention can be attained by dispersing separately each of the magnetic powder and the non-magnetic metal oxide particles to form a dispersion (separate dispersion) and then mixing both dispersions to prepare a coating solution for the magnetic layer.

It is surprising that the problem which has not heretofore been solved, was overcome by dispersing in such a manner as above-mentioned. Although its mechanism is not very clear, it is presumed that in the simultaneous dispersion, non-magnetic metal oxide particles are supposed to inflict injury or fracture the surface of the magnetic powder. To the contrary, there are no such problems in the above-mentioned dispersion, whereby both the magnetic powder and the non-magnetic metal oxide particles can exert their own functions.

Still another means for reducing clogging of the gap in the magnetic head is that the binder of the magnetic recording layer is hardened by a hardener in an amount of 15–30% by weight of the binder and, more preferably, by an isocyanate-type hardener.

Although, as in the conventional magnetic recording medium, the strength of the coated magnetic recording layer is almost the same with the use of not more than 10% by weight of a hardener with respect to the binder, however, it was found that the contact angle increased by adding further more hardener, leading to reduction of the clogging of the magnetic head.

Particularly, in the case of the isocyanate-type hardeners, remarkable effects are displayed in an amount of 15 wt % or more, however, in the region more than 30 wt %, their effects reach the uppermost limit and they begin to have an unfavorable effect on the traveling property. It is surprising to know that the addition amount of the hardener has favorable effects on the improvement of the surface.

As regards isocyanate-type hardeners, those disclosed in, for example, Japanese Patent O.P.I. Publication Nos. 50-62627/1975,51-28223/1976,56-48897/1981, 6-59357/1994, etc. can be utilized. Particularly, in the present invention, those having in their molecules three or more isocyanate groups, and three functional-type compounds such as reaction products of toluidine diisocyanates and trimethylol propane are particularly effective.

The present inventors have found that the isocyanate-type hardener displays large effects of the invention when it is incorporated in a coating solution for the magnetic recording medium through in-line addition, not through batchwise addition. Thus, the hardener is continuously added to, and mixed with, a stream of the coating solution at a point between the supply vessel in which the coating solution originates, and a coater, and immediately before coating. It is contemplated that effective and uniform hardening can be achieved by the in-line addition, leading to improvements in the surface properties of the magnetic recording layer.

In the present invention, thickness of the magnetic recording layer is, preferably, between 0.01 and 20 $\mu$m, more preferably, between 0.05 and 15 $\mu$m and, still more preferably, between 0.1 and 10 $\mu$m.

In the coating solution for forming the magnetic recording layer, various kinds of additives may be incorporated for the purpose of conferring it a various physical properties such as lubricating, anti-static, anti-adhesion, anti-abrasion, anti-wearing properties, etc. Moreover, besides those additives mentioned above, various other kinds of additives may also be added in the coating solution. These additives include, for example, a plasticizer which confers on the magnetic recording layer flexibility; a dispersant for promoting dispersion of the magnetic powder in the coating solution. The above-mentioned functions of lubricity, anti-static, anti-adhesion, anti-abrasion or anti-wearing, etc. may also be attained by providing a respective functional layer in addition to the magnetic recording layer.

For example, when the magnetic recording layer according to the present invention is provided on an anti-static layer, since a uniform thin layer may easily be formed due to its excellent film-forming property, better anti-static property can be obtained than the conventional case, in which the anti-static layer had been formed on a transparent magnetic layer. If necessary, anti-abrasion property may be improved by providing a protective layer adjacent to the magnetic recording layer. Further, in the case where the magnetic recording layer is provided in the form of a stripe, a level difference may be eliminated by providing a transparent polymer layer, not containing the magnetic powder on it. In this case, this transparent layer may have the above-mentioned various functions. Since the binder system according to the present invention has excellent film-forming property and strength, not only the above-mentioned magnetic powder but also the above-mentioned various additives can be dispersed in combination, which is advantageous in view of manufacturing.

It is possible improve the S/N ratio of magnetic output by subjecting the magnetic recording layer to calendering treatment, thus to improve evenness, after providing the magnetic recording layer. In this case, it is preferable for silver halide photographic component layers to be coated after the calendering treatment.

As the ferromagnetic fine powder, for example, a fine powder of ferromagnetic iron oxide; cobalt-doped fine powder of ferromagnetic iron oxide; fine powder of ferromagnetic chromium dioxide, fine powder of ferromagnetic metal; fine powder of a metal alloy; barium ferrite; etc., can be used.

The fine particles of a ferromagnetic powders can be manufactured according to the conventionally known methods.

As for shapes, either one such as needle, a rice grain, a spherical, a cubic or a tabular shape can be employed. In light of electromagnetic conversion, needle or tabular shape is preferable. Although there is no specific limit as to particle size or the specific surface area, however, not larger than 400 angstroms in size and not smaller than 20 $m^2$ in terms of the BET value are generally preferable, respectively. As regards the surface area, not smaller than 30 $m^2$ is particularly preferable. There is no specific limit as to the pH of the ferromagnetic fine powder and surface treatment thereof. Preferable pH is between 5 and 10. In the case of ferromagnetic fine powder of iron oxide, any one can be used regardless of the ratio of divalent/tri-valent iron. Concerning these magnetic recording layers, there are referred descriptions in Japanese Patent O.P.I. Publication Nos. 47-32812 and 53-109604.

Preferable amount of use of the magnetic particles in accordance with the present invention is not less than $4 \times 10^{-4}$ g per 1 $m^2$ of the magnetic recording layer. In the case it is smaller than this value, hindrance in inputting to or outputting from the magnetic recording medium may be brought about. Moreover, there is no specific limit as to the least upper bound so far as the optical density at 436 nm is 1.5 or less, however, 4 g per 1 $m^2$ or thereabouts may be the practical upper limit and, it is more than this, optical influence can be brought about in the photographic constituent layer.

In order to form a magnetic recording layer which is optically transparent, it is preferable that a binder is used at an amount of 1 to 200 parts by weight with respect to 1 part by weight of the magnetic powder. Still more preferably, it is 20 to 50 parts by weight with respect to 1 part by weight of the magnetic powder. Further, solvent may be used in the amount within which coating can be performed easily.

As for the method of providing the magnetic recording layer, any method, including, for example, extrusion coating, air-doctor coating, blade coating, air-knife coating, impregnation coating, reverse coating, transfer-roll coating gravure coating, kissing coating, cast coating, spray coating, etc. can be applied. When coating is carried out in stripes, a plurality of coating heads can be employed. Concerning specific methods of the stripe coating, descriptions in, for example, Japanese Patent O.P.I. Publication Nos. 48-25503, 48-25504, 48-98803, 50-138037, 52-15533, 51-3208, 51-6239, 51-65606 and 51-140703; Japanese Patent Publication No. 29-4221; U.S. Pat. Nos. 3,062,181 and 3,227,165 can be refereed.

In order to adhere the magnetic recording medium firmly to the support, a subbing layer may be provided on the support. Also, the support may be subjected to surface activation treatments. Such treatments include, for example, treatment by chemicals or chemical treatment, mechanical treatment, corona discharge treatment fire flame treatment, UV-ray treatment, high frequency treatment, glow discharge treatment, active plasma treatment, laser treatment, concentrated acid treatment and ozone oxidation treatment. Still further, the subbing layer may be provided after these surface activation treatments. Aqueous-type latices are usually preferable for the subbing layer.

For the binder to be employed in the magnetic recording layer or the subbing layer, for example, thermoplastic resins, radiation-hardenable resins, thermosetting resins and other reaction-type resins can be used and they are used either singly or in combination after dissolving or dispersing in an organic solvent or water.

As for the above-mentioned thermoplastic resins, for example, vinyl polymers or copolymers such as vinyl chloride-vinyl acetate copolymers, vinyl chloride resins, vinyl acetate resins, copolymers of vinyl acetate and vinyl alcohol, partially hydrolyzed vinyl chloride-vinyl acetate copolymers, vinyl chloride-vinylidene chloride copolymers, vinyl chloride-acrylonitrile copolymers, ethylene-vinyl alcohol copolymers, fluorinated polyvinyl chloride, ethylene-vinyl chloride copolymers, ethylene-vinyl acetate copolymers; cellulose derivatives such as nitro cellulose, cellulose acetate butyrate, etc.; copolymers of maleic acid and/or acrylic acid; acrylate copolymers, acrylonitrile-styrene copolymers, chlorinated polyethylene-styrene copolymers, acrylonitrile-chlorinated polyethylene-styrene copolymers, methyl methacrylate-butadiene-styrene copolymers, acryl resins, polyvinyl acetal resins, polyvinyl butyral resins, polyester polyurethane resins, polyether-polyurethane resins, polycarbonate-polyurethane resins, polyester resins, polyether resins, polyamide resins, amino resins, styrene-butadiene resins, rubber-type resins such as butadiene-acrylonitrile resins, silicone resins and fluorinated-type resins can be mentioned.

The thermoplastic resins preferably have a glass transition temperature of –40 to 180° C. and, more preferably, –30 to 150° C. Preferable weight average molecular weight is between 5,000 and 300,000 and, still more preferably, they have a weight average molecular weight between 10,000 and 200,000. In the magnetic recording layer according to the present invention, a thermoplastic resin having Tg higher than 50° C. and one having Tg below 30° C. may be used in combination. Concerning the glass transition temperature Tg, there is a detailed explanation in "Shin Jikken Kagaku Koza" (New Series of Experimental Chemistry) Vol. 19 (Polymer Chemistry II), published by Maruzen Publishing Co., Ltd.

These may also be used in the form of either an aqueous emulsion or an aqueous colloidal solution. The particle size of these synthetic resin-type emulsion is preferably 5 nm to 2 µm.

The term "radiation-hardenable resin" is referred to as a resin which is capable of being set with radioactive rays, such as electron beam, ultra-violet ray, etc. and, for example, maleic acid anhydride-type, urethane-acrylic-type, ether-acrylic-type and epoxy-acryl-type resins can be mentioned.

Further, as for thermosetting resin and other reactive-type resins, for example, phenol resins, epoxy resins, polyurethane-type hardening-type resins, urea resins, alkyd resins, and silicone-type hardening resins can be mentioned.

The above-mentioned binders may have a polar group in their molecules. Examples of the polar group include an epoxy group, a —COOH group, an —OH group, an —NR$_2$ group, an NR$_3$X group, an —SO$_3$M group, an —OSO$_3$M group or a —PO$_3$M$_2$ group; wherein M and M$_2$ independently represent a hydrogen atom, an alkali metal atom, or an ammonium group; X represents an acid forming an amine salt; R$_2$ and R$_3$ independently represent a hydrogen atom or an alkyl group.

As for other hydrophilic binder, which may be employed in the present invention, for example, water-soluble polymers, cellulose ethers, latex polymers and water-soluble polyesters disclosed in Research Disclosure No. 17643 on page 26 and No. 18761 on page 651 can be mentioned.

As water-soluble polymers, in addition to the above, for example, gelatin, gelatin derivatives, casein, agar, sodium arginate, starch, polyvinyl alcohol, acrylic acid-type copolymers, and maleic acid anhydride copolymers, etc. can be mentioned, and, as for cellulose esters, for example, methyl cellulose, carboxy methyl cellulose, hydroxyethyl cellulose, hydroxypropyl cellulose, etc. can be mentioned.

When a water-soluble polymer is used, it is preferable to use a hardener. As for applicable hardeners, for example, aldehyde-type compounds, ketone compounds, compounds having reactive halogen atoms, compounds having reactive olefins, N-methylol-type compounds, aziridine-type compounds, acid derivatives, epoxy-type compounds, halogen carboxyaldehyde compounds, chrome alum, zirconium sulfate and carboxyl group activation-type hardeners, etc. can be mentioned. The hardener is usually used 0.01 to 60 parts by weight and, more preferably, 0.05 to 50 parts by weight with respect to solid ingredient of the resin.

As lubricants used in the magnetic recording layer according to the present invention, for example, silicone oil, such as polysiloxane, fine particles of plastic such as polyethylene, polytetrafluoroethylene, etc.; higher fatty acids; higher fatty acid esters; paraffin waxes; fluorocarbons, etc. can be mentioned. To be specific, these can be used either singly or two or more kinds in combination. Added amount of these compounds may usually be within a rage between 0.5 and 20 parts by weight with respect to 100 parts by weight of dry film coated. Those which are either water-soluble or water-dispersible are preferable.

As non-magnetic metal oxide particles used in the magnetic recording layer according to the present invention, those of which Mohs hardness is 5 or more and, preferably, 6 or more can be mentioned. Exenplary examples thereof include oxides such as aluminum oxides (α-alumina, γ-alumina, corundum, etc.); chromium oxide (Cr$_2$O$_3$), titanium dioxide, etc.; carbides such as titanium carbide, etc. The average particle size of these non-magnetic particles is, preferably, 0.01–2.0 µm and they can be added at an amount of 0.5–300 parts by weight with respect to 100 parts by weight of the magnetic powder.

As anti-static agents which may be incorporated in the magnetic recording layer according to the present invention, fine particles of a conductive metal oxide are preferred. For example, oxides containing superfluous oxygen such as Nb$_2$O$_{5+x}$; oxygen-deficient oxides such as Rh$_5$O$_{2-x}$, IrO$_{3-x}$, etc.; non-stoichiometric hydrides such as Ni(OH)$_x$; HfO$_2$, ThO$_2$, ZrO$_2$, CeO$_{O2}$, ZnO, TiO$_2$, SnO$_2$, Al$_2$O$_3$, In$_2$O$_3$, SiO$_2$, MgO, BaO, MoO$_2$, V$_2$O$_5$, etc. or complex oxides of these are preferable and, particularly, ZnO, TiO$_2$ and SnO$_2$ are preferable. As examples containing hetero-atomic elements, for example, addition of Al, In, etc. To ZnO; addition of Nb, Ta, atom, etc. to TiO$_2$; and addition of Sb, Nb, a halogen atom, etc. To $SnO_2$ is preferable. Amount of addition of these hetero-atomic elements is preferably practiced in the range between 0.01 and 25 mol % and between 0.1 and 15 mol % is particularly preferable.

Further, the volume resistivity of these conductive metal oxide particles is, preferably, not more than $10^7$ Ωcm and, more preferably, not more than $10^5$ Ωcm. Still further, a sol, in which the fine particles of the metal oxides are admixed into an aqueous solution, may also be used.

Besides these, electro-conductive fine particles such as carbon black, carbon black graft polymers; nonionic surface active agents such as alkylene oxide-type, glycerin-type, glycidol-type, etc.; salts such as higher alkylamine compounds, quaternary ammonium compounds, salts of pyridine and other heterocyclic compounds; cationic-type surface active agents such as phosphonium, sulfonium, etc.; anionic-type surface active agents such as those containing acid groups such as carboxylic acids phosphoric acids, sulfates, phosphates, etc., amino acid compounds, aminosulfonic acid compounds, sulfates or phosphates of amino alcohols; etc., can be mentioned.

Since the binders used in the present invention have excellent dispersibility of these anti-static agents, therefore, leading to excellent electro-conductivity of the magnetic recording layer. The surface active agents may be contained as substituents of polymers.

As solvents used at the time of dispersion, kneading or coating, for example, ketones such as acetone, methylethyl ketone, methylisobutyl ketone, cyclohexanone, isohorone, tetrahydrofurane, etc.; alcohols such as methanol, ethanol. Propanol, butanol, isobutanol, isopropanol, methylcyclohexanol, etc.; esters such as methyl acetate, ethyl acetate, butyl acetate, isobutyl acetate, isopropyl acetate, ethyl lactate, glycol acetate monoethyl ether, etc.; ether, glycol ethers such as glycoldimethyl ether, glycol monoethyl ether, dioxane, etc.; tars (aromatic hydrocarbons) such as benzene, toluene, xylene, cresol, chloro benzene, styrene, etc.; chlorinated hydrocarbons such as methylene chloride, ethylene chloride, tetrachloromethane, chloroform, ethylene chlorohydrine, dichloro benzene, etc., N,N-dimethyl-formaldehyde, hexane, water, etc. can be used.

In the present invention. various kinds can be used as supports. As usable supports, for example, polyester films such as polyethylene terephthalate, polyethylene naphthalate, etc.; cellulose triacetate film, cellulose diacetate film, polycarbonate films, polystyrene films, polyolefin films, etc. can be mentioned.

There is no specific limit with respect to polyester supports. For example, condensation polymers of aromatic dicarboxylic acid such as terephthalic acid, isophthalic acid, phthalic acid, naphthalene dicarboxylic acid, etc. and alkylene glycols such as ethylene glycol, 1,3-propanediol, 1,4-butanediol, etc.; for example, poly(ethylene terephthalate), poly(ethylene 2,6-dinaphthalate), poly(propylene terephthalate), poly(butylene terephthalate), etc., and copolymers thereof can be mentioned.

Particularly in light of property of anti-stay-curl after development, it is preferable to use polyesters having high moisture content such as those disclosed in Japanese Patent O.P.I. Publication Nos. 1-244446, 1-291248, 1-298350, 2-89045, 2-93641. 2-181749 and 2-214852, etc.

These polyesters may contain a polar group or other substituent groups.

In the present invention, as the support, polyethylene terephthalate or polyethylene naphthalate is preferable.

For the purpose of satisfying mechanical strength as a film support, dimensional stability, etc., the above-mentioned polyesters are preferably stretched by 4–16 times in an area ratio. Further, it is preferable for the above-mentioned films to be subjected to thermal treatment (annealing treatment) as disclosed in Japanese Patent O.P.I. Publication No. 51-16358 after film-formation.

There may be incorporated in the support a matting agent, an anti-static agent, a lubricating agent, a surface active agent, a stabilizer, a dispersant, a plasticizer, an ultraviolet-ray absorbent, electro-conductive substance, a thickening agent, a softening agent, a fluidity-providing material, viscosity-increasing agent, and anti-oxidant, etc.

The support may contain a dye for the purpose of neutralizing hue of the minimum density portion of the film, or preventing light piping (edge fogging) caused when light comes in from the edge of the film support having thereon photographic constituent layers or halation.

There is no specific limit as to the kind of dyes. In the case where a polyester film is used as the support, one having excellent a heat resisting property is preferable. For example, anthraquinone-type dyes can be mentioned. For color hue of the dye, in the case when prevention of light piping is aimed at, as is the case in the popular light sensitive materials, gray dye is preferable. The dye may be employed either singly or in combination thereof. For example, "Diaresin", a product of Mitsubishi Chemical Co., Ltd. and "MACROLEX", a product of Bayer, Ltd., etc. may be used singly or in combination.

In the invention, photographic component layers may be provided on the side of the support opposite to the side of the magnetic recording layer. A variety of known technologies can be applied to the photographic component layers.

In the invention, silver halide emulsions, for example, as disclosed in the Research Disclosure No. 308119 (hereinafter referred to as RD 308,119) can be used.

Below, locations of disclosure are given.

| [Item] | [Pages in RD 308,119] |
|---|---|
| Iodide Composition | 993, I-A |
| Manufacturing Method | 993, I-A and 994 E |
| Crystal Habit | |
| Regular Crystals | 993, I-A |
| Twin Crystals | 993, I-A |
| Epitaxials | 993, I-A |
| Halide Composition | |
| Uniform | 993, I-B |
| Non-Uniform | 993, I-B |
| Halide Conversion | 994, I-C |
| Halide Substitution | 994, I-C |
| Metal Occlusion | 994, I-D |
| Mono-Dispersion | 995, I-F |
| Addition of Solvent | 995, I-F |
| Location of Latent Image Formation | |
| Surface | 995, I-G |
| Inside | 995, I-G |
| Applicable Photographic Material | |
| Negative | 995, I-H |
| Positive (Including Inside Fogging) | 995, I-H |
| Mixed Emulsion | 995, I-J |
| Desalination | 995, II-A |

In the invention, the silver halide emulsion is subjected to physical ripening, chemical ripening and spectral-sensitization. Additives used in these processes are disclosed in RD 17643, 18716 and 308119.

Below, locations of the disclosure are given.

| Item | Page in [RD 308119] | Pages in [RD 17643] and [RD 18716] |
| --- | --- | --- |
| Chemical Sensitizer | 996, III-A | 23, 648 |
| Spectral Sensitizer | 996, IV-A-A,B,C,D,H,I,J | 23–24, 648–9 |
| Hyper Sensitizer | 996, IV-A-E,J | 23–24, 648–9 |
| Anti-Foggant | 998-VI | 24–25, 649 |
| Stabilizer | 998-VI | 24–25, 649 |

Conventional photographic additives are also described in the above-mentioned Research Disclosure.

Locations of relevant disclosure are given below.

| [Item] | Page in [RD 308119] | Pages in [17643] and [18716] |
| --- | --- | --- |
| Anti-Staining Agent | 1002 VII-I | 25, 650 |
| Dye-Image Stabilizer | 1001 VII-J | 25, — |
| Whitening Agent | 998 V | 24, — |
| UV Absorbent | 1003 VIII-C, XIII-C | 25–26 |
| Light Absorbent | 1003 VIII | 25–26 |
| Light Scattering Agent | 1003 VIII | — |
| Filtering Dye | 1003 VIII | 25–26 |
| Binder | 1003 IX | 26, 651 |
| Anti-static agent | 1006 XIII | 27, 650 |
| Hardener | 1004 X | 26, 651 |
| Plasticizer | 1006 XII | 27, 650 |
| Lubricating Agent | 1006 XII | 27, 650 |
| Matting Agent | 1007 XVI | |
| Developing Agent | 1011 XXB | |

In the present invention, a variety of couplers can be incorporated. Specific examples are disclosed in the above-mentioned Research Disclosure.

Below, locations of relevant disclosure are given.

| Item | [Page in RD 308119] | [Pages in RD 17643 and/or RD 18716] |
| --- | --- | --- |
| Yellow Coupler | 1001 VII-D | VII C - G |
| Magenta Coupler | 1001 VII-D | VII C - G |
| Cyan Coupler | 1001 VII-D | VII C - G |
| Colored Coupler | 1002 VII-G | VII G |
| DIR Coupler | 1001 VII-F | VII F |
| BAR Coupler | 1002 VII-F | |
| Other Effective Residue-Releasing Coupler | 1001 VII-F | |
| Alkali Soluble Coupler | 1001 VII-E | |

The additives used in the present invention can be added by the dispersing method disclosed in XIV of RD 308,119, etc. In the present invention, supports disclosed on page 28 of the above-mentioned Research Disclosure No. 17,643, on pages 647–648 of RD No. 18,716 and in XIX in RD 308,119. can be utilized. In the photographic component layers used in the present invention, auxiliary layers disclosed in RD 308119 Item VII-K including, for example, a filter layer, an interlayer, etc. may be provided.

In the photographic component layers used in the invention can take various configurations such as conventional layer order, reverse layer order, unit constitution, etc., which are described in the above-mentioned RD 308119, Item VII-K.

To carry out processing of the photographic component layers, developing agents known in the art, as described in T. H. James, The Theory of The Photographic Process, 4th edition, pages 291–334 and Journal of the American Chemical Society. 73 [3] 100 (1951) can be used. Furthermore, color photographic component layers may be processed by the conventional method, as described on pages 28–29 of RD 17643, on page 615 of RD 18716 or in Item XIX of RD 308119.

EXAMPLES

Below, the present invention is explained more specifically, however, the scope of the present invention is not limited thereto.

Example 1

Preparation of a Magnetic Recording Medium
Preparation of a Support 0.1 part by weight of calcium acetate mono-hydrate as an esterification catalyst was added to 100 parts by weight of 2,6-naphthalenedimethyl carboxylate and 60 parts by weight of ethylene glycol and, thus, esterification reaction was conducted according to a conventional method. To the thus obtained product 0.05 part by weight of antimony trioxide and 0.03 part by weight of trimethyl phosphate was added. Then polymerization was performed while gradually increasing temperature and reducing air pressure to the conditions at 290° C. and 0.05 mmHg, respectively, to obtain polyethylene-2,6-naphthalate, of which intrinsic viscosity is 0.6.

Then, after the product was subjected to vacuum drying for 8 hours at 150° C., this was extruded from a T-die at 300° C. and in the form of a layer, and it was brought into close contact with a cooling drum at 50° C., to cool and solidify, to obtain unextended sheet. This unextended sheet was extended to the longitudinal direction in the longitudinal direction with the drawing magnification ratio at 3.3. Next, this was thermally treated for two seconds at 100° C. and, then, it was thermally set for five seconds at 200° C. in the first setting zone and, subsequently, this was further subjected to thermal setting for 15 seconds at 240° C. in the second setting zone. Next, while subjecting it to relaxation treatment in the lateral direction at the ratio of 5%, the film was gradually cooled to the room temperature, taking 30 seconds, thus to obtain a with 85-$\mu$m-thick polyethylene terephthalate film.

This was wound around a core made of stainless steel and was subjected to a thermal treatment (i.e., anieling treatment) for 48 hours at 110° C., to prepare a support.

Both surfaces of this support were subjected to corona discharge treatment and on one surface thereof was coated with a subbing layer so that the thickness becomes 0.4 Mm and, then, after this was subjected to corona discharge treatment with a condition of 12 W/m$^2$/min., another subbing layer was coated so that the dry thickness of this layer was 0.06 $\mu$m.

Another surface of the support, which was subjected to corona discharge treatment, was coated with a subbing coating solution B-3, so that dry thickness becomes 0.2 $\mu$m and, then, after another corona discharge treatment under 12 W/m$^2$/min. Was conducted on this, another coating solution B-4 was coated so that dry thickness becomes 0.2 $\mu$m.

Respective layers were dried for ten seconds at 90° C. Subsequent to coating four layers, thermal treatment for two minutes at 110° C. was conducted and the product was subjected to cooling treatment for 30 seconds at 50° C.

Coating Solution for Subbing Layer B-1

A latex solution of a copolymer (solid constituent: 30%) consisting of:

| | |
|---|---|
| Butyl acrylate | 30% by weight |
| t-butyl acrylate | 20% by weight |
| Styrene | 25% by weight and |
| 2-Hydroxyethyl acrylate | 25% by weight |
| | 125 g |
| Compound (UL-1) | 0.4 g |
| Hexamethylene-1,6-bis(ethylene urea) | 0.05 g |
| finish with water to | 1000 ml |

A Coating Solution for Subbing Layer B-2

| | |
|---|---|
| Aqueous sodium hydroxide solution of styrene - maleic acid anhydride(solid constituent: 6%) | 50 g |
| Compound (UL-1) | 0.6 g |
| Compound (UL-2) | 0.09 g |
| Silica Particles (average particle diameter: 3 μm) | 0.2 g |
| Finish with water | 1000 ml |

A Coating Solution for Subbing Layer B-3

A latex solution of a copolymer(solid constituent: 30%) consisting of:

| | |
|---|---|
| butyl acrylate | 30% by weight |
| t-butyl acrylate | 20% by weight |
| styrene | 25% by weight |
| 2-hydroxy acrylate | 25% by weight |
| | 50 g |
| Compound (UL-1) | 0.3 g |
| hexamethylene-1,6-bis(ethylene urea) | 1.1 g |
| Finish with water | 1000 ml |

UL-1 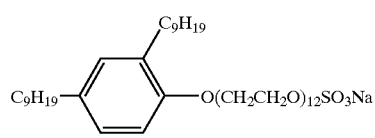

UL-2 

Coating Solution B-4

60 mol % of dimethyl terephthalate, 30 mmol % of dimethylisophthalate and 10 mol % of sodium salt of dimethyl 5-sulfoisophthalate as dicaroxylic acid constituent, and 50 mol % of ethylene glycol, and 50 mol % of diethylene glycol were copolymerized according to a conventional method. This copolymer was stirred in hot water for three hours, to make an aqueous dispersion liquid A.

| | |
|---|---|
| An aqueous dispersion containing composite particles of tin oxide - antimony oxide (average diameter: 0.2 μm; solid ingredient: 40% by weight) | 109 g |
| Aqueous dispersion A | 67 g |
| Finish with water to | 1000 ml |

Coating of The Magnetic Recording Layer

On the layer formed by coating a solution for the subbing layer U-4 on the above-mentioned subbing-treated support, a coating solution for the magnetic recording layer, the composition of which is given below, was provided using a precision extrusion coater so that dry thickness of the layer becomes 0.8 μm. At the time of drying the coated film and while the coated layer is not still dried, the magnetic powder was oriented to the coating direction, so as to enhance output performance at the time of recording and reproduction.

| | |
|---|---|
| Cobalt-containing γ-iron oxide (average length of longer axis: 12 μm; average length of shorter axis: 0.015 μm; $Fe^{3+}/Fe^{2+}$ = 0.2; specific surface area: 40 $m^2$/g; Hc = 7400 Oe) | 10 parts by weight |
| Alumina (α-$Al_2O_3$; average particle size: 0.2 μm) | 3 parts by weight |
| Diacetyl cellulose (a production of Teijin Co., Ltd.) | 150 parts by weight |
| Polyurethane (N3132: a product of Nippon Polyurethane Co., Ltd.) | 15 parts by weight |
| Stearic acid | 2 parts by weight |
| Cyclohexanone | 920 parts by weight |
| Acetone | 920 parts by weight |

After mixing and dispersing these ingredients well and after they were dispersed using a sand mill, 50 parts by weight of coronate-3041 of polyisocyanate (a product of Nippon Polyurethane Co., Ltd.; solid ingredient: 50%) was added and mixed thoroughly, to make Magnetic Paint M-1.

Coating of a Lubricating Layer

A solution for a lubricating layer, hereinafter referred to as "wax solution", was prepared so that carnauba wax was contained at 0.1% in a water/methanol mixed solution and, then, this was coated on the above-mentioned magnetic recording layer so that coated amount of said wax became 15 mg/$m^2$. After the raw fabric after completion of wax coating was dried by passing through a thermal treatment zone for 5 minutes at 100° C., this was left alone for five days, thus to proceed crosslinking reaction of isocyanate.

Preparation of Wax Solution

To 100 parts by weight of water, which was heated to 90° C., 4 parts by weight of polyoxyethylene lauryl ether was mixed and, to this, after adding 40 parts by weight of carnauba wax, which was separately prepared was added, stirred sufficiently using a high speed stirring-type homogenizer and, thus to prepare an aqueous dispersion of carnauba wax (WAX1).

Next, 995 parts by weight of water, 900 parts by weight of methanol and 100 parts by weight of propyleneglycol monomethyl ether were mixed and, then 5 parts by weight of WAX1 was added and stirred, to prepare a wax solution.

On the opposite surface of the support of the above-mentioned magnetic recording medium with respect to the magnetic recording layer, after the above-mentioned coating solutions B-1 and B-2 were coated under the same conditions as in the other surface of the support, photographic constituent layers having the following compositions were provided , to prepare Sample 101. Herein, the amount of addition was given in terms of gram per 1 square meter of the magnetic recording medium, provided, however, added amount of silver halide and colloidal silver was given in terms of amount of equivalent amount of silver, and that of sensitizing dyes was given in terms of mol per 1 mol of silver.

| 1st Layer: Anti-Halation Layer | |
|---|---|
| Black colloidal silver | 0.16 |
| UV-1 | 0.3 |
| CM-1 | 0.044 |
| OIL-1 | 0.044 |
| Gelatin | 1.33 |
| 2nd Layer: Intermediate Layer | |
| AS-1 | 0.16 |
| OIL-1 | 0.20 |
| Gelatin | 1.40 |

-continued

| 3rd Layer: Low-speed Red-Sensitive Layer | |
|---|---|
| Silver iodobromide emulsion a | 0.12 |
| Silver iodobromide emulsion b | 0.50 |
| SD-1 | $3.0 \times 10^{-5}$ |
| SD-4 | $1.5 \times 10^{-4}$ |
| SD-3 | $3.0 \times 10^{-4}$ |
| SD-6 | $3.0 \times 10^{-6}$ |
| C-1 | 0.51 |
| CC-1 | 0.047 |
| OIL-2 | 0.45 |
| AS-3 | 0.005 |
| Gelatin | 1.40 |
| 4th Layer: Medium-speed Red-sensitive Layer | |
| Silver iodobromide emulsion c | 0.64 |
| SD-1 | $3.0 \times 10^{-5}$ |
| SD-2 | $1.5 \times 10^{-4}$ |
| SD-3 | $3.0 \times 10^{-4}$ |
| C-2 | 0.22 |
| CC-1 | 0.028 |
| DI-1 | 0.002 |
| OIL-2 | 0.21 |
| AS-3 | 0.006 |
| Gelatin | 0.87 |
| 5th Layer: High-speed Red-Sensitive Layer | |
| Silver iodobromide emulsion c | 0.13 |
| Silver iodobromide emulsion d | 1.14 |
| SD-1 | $3.0 \times 10^{-5}$ |
| SD-2 | $1.5 \times 10^{-4}$ |
| SD-3 | $3.0 \times 10^{-4}$ |
| C-2 | 0.085 |
| C-3 | 0.084 |
| CC-1 | 0.029 |
| DI-1 | 0.027 |
| OIL-2 | 0.23 |
| AS-3 | 0.013 |
| Gelatin | 1.23 |
| 6th Layer: Intermediate Layer | |
| OIL-1 | 0.29 |
| AS-1 | 0.23 |
| Gelatin | 1.00 |
| 7th Layer: Low-speed Green-Sensitive Layer | |
| Silver iodobromide emulsion a | 0.245 |
| Silver iodobromide emulsion b | 0.105 |
| SD-6 | $5.0 \times 10^{-4}$ |
| SD-5 | $5.0 \times 10^{-4}$ |
| M-1 | 0.21 |
| CM-2 | 0.039 |
| OIK-1 | 0.25 |
| AS-2 | 0.003 |
| AS-4 | 0.063 |
| Gelatin | 0.98 |
| 8th Layer: Intermediate Layer | |
| M-1 | 0.03 |
| CM-2 | 0.005 |
| OIL-1 | 0.16 |
| AS-1 | 0.11 |
| Gelatin | 0.80 |
| 9th Layer: Medium-speed Green-Sensitive Layer | |
| Silver iodobromide emulsion e | 0.87 |
| SD-7 | $3.0 \times 10^{-4}$ |
| SD-8 | $6.0 \times 10^{-5}$ |
| SD-9 | $4.0 \times 10^{-5}$ |
| M-1 | 0.17 |
| CM-2 | 0.048 |
| CM-3 | 0.059 |
| DI-2 | 0.012 |
| OIL-1 | 0.29 |
| AS-4 | 0.05 |
| AS-2 | 0.005 |
| Gelatin | 1.43 |
| 10th Layer: High-speed Green-Sensitive Layer | |
| Silver iodobromide emulsion f | 1.19 |

-continued

| | |
|---|---|
| SD-7 | $4.0 \times 10^{-4}$ |
| SD-8 | $8.0 \times 10^{-5}$ |
| SD-9 | $5.0 \times 10^{-5}$ |
| M-1 | 0.09 |
| CM-3 | 0.020 |
| DI-3 | 0.005 |
| OIL-1 | 0.11 |
| AS-4 | 0.026 |
| AS-5 | 0.014 |
| AS-6 | 0.006 |
| Gelatin | 0.78 |
| 11th Layer: Yellow Filter Layer | |
| Yellow colloidal silver | 0.05 |
| OIL-1 | 0.18 |
| AS-7 | 0.16 |
| Gelatin | 1.00 |
| 12th Layer: Low-speed Blue-sensitive Layer | |
| Silver iodobromide emulsion g | 0.29 |
| Silver iodobromide emulsion h | 0.19 |
| SD-10 | $8.0 \times 10^{-4}$ |
| SD-11 | $3.1 \times 10^{-4}$ |
| Y-1 | 0.91 |
| DI-4 | 0.022 |
| OIL-1 | 0.37 |
| AS-2 | 0.002 |
| Gelatin | 1.29 |
| 13th Layer: High-speed Blue-sensitive Layer | |
| Silver iodobromide emulsion h | 0.13 |
| Silver iodobromide emulsion i | 1.00 |
| SD-10 | $4.4 \times 10^{-4}$ |
| SD-11 | $1.5 \times 10^{-4}$ |
| Y-1 | 0.48 |
| DI-4 | 0.019 |
| OIL-1 | 0.21 |
| AS-2 | 0.004 |
| Gelatin | 1.55 |
| 14th Layer: First Protective Layer | |
| Silver iodobromide emulsion j | 0.30 |
| UV-1 | 0.055 |
| UV-2 | 0.110 |
| OIL-2 | 0.63 |
| Gelatin | 1.32 |
| 15th Layer: Second protective Layer | |
| PM-1 | 0.15 |
| PM-2 | 0.04 |
| WAX-1 | 0.02 |
| D-1 | 0.001 |
| Gelatin | 0.55 |

In addition to the above composition, there were added coating-aids SU-1, SU-2 and SU-3; dispersing-aid SU-4; thickener V-1; stabilizers ST-1 and ST-2; antifoggant AF-1; poly(vinyl pyrrolidone) comprised of weight-averaged molecular weights of 10,000 and 1,100,000 (AF-2); restrainers AF-3, AF-4 and AF-5; hardeners H-1 and H-2; and anti-septic Ase-1.

Chemical formulas of compounds employed in the above sample are shown as below. Further, characteristics of silver iodobromide are shown in Table 1.

TABLE 1
| Emulsion No. | Av. grain size (μm) | Av. AgI content (mol %) | Aspect ratio |
| --- | --- | --- | --- |
| a | 0.30 | 2.0 | 1.0 |
| b | 0.40 | 8.0 | 1.4 |
| c | 0.60 | 7.0 | 3.1 |
| d | 0.75 | 7.0 | 5.0 |
| e | 0.60 | 7.0 | 4.1 |
| f | 0.65 | 9.0 | 6.5 |
| g | 0.40 | 2.0 | 4.0 |
| h | 0.65 | 8.0 | 1.4 |
| i | 1.00 | 8.0 | 2.0 |
| j | 0.05 | 2.0 | 1.0 |
C-1
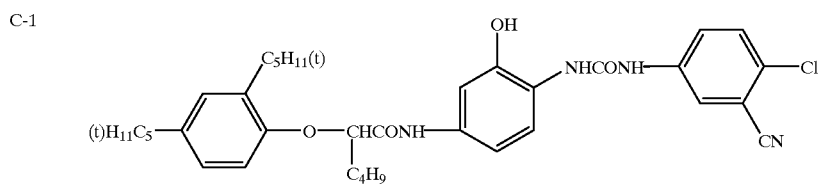
C-2
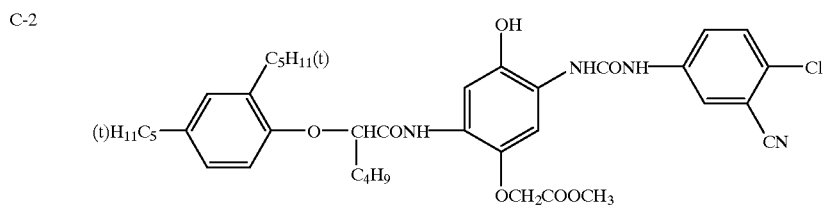
C-3
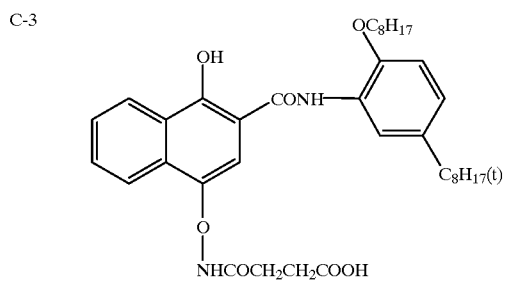
M-1
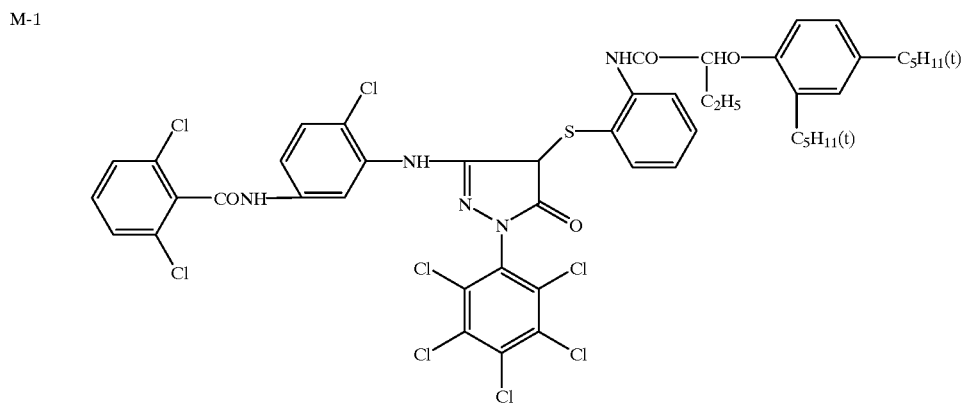

TABLE 1-continued
Y-1
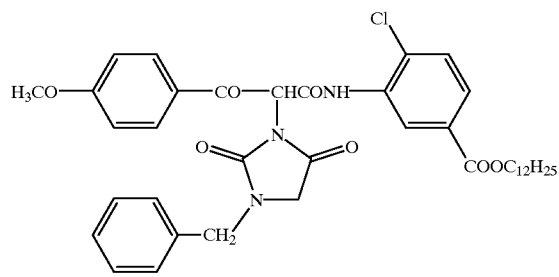
CC-1
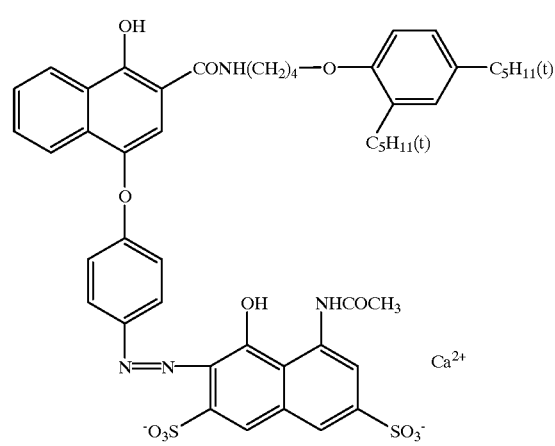
CM-1
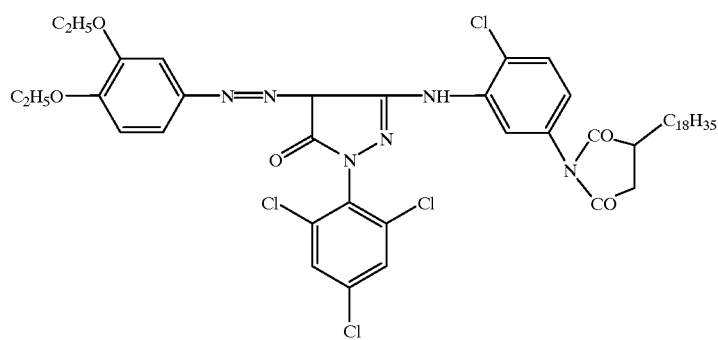
CM-2
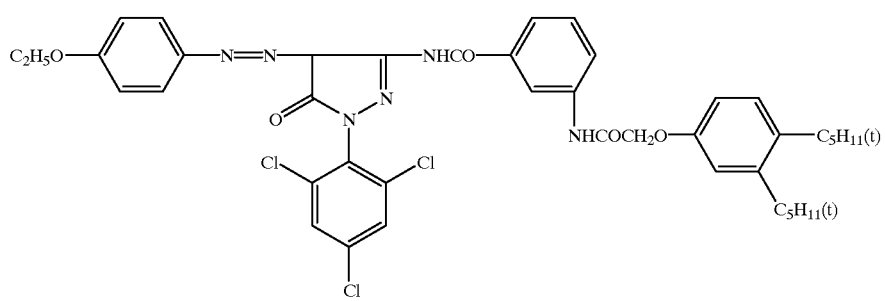

TABLE 1-continued
CM-3 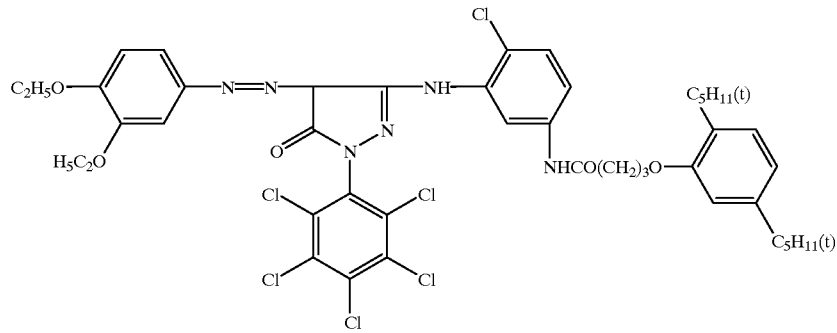
DI-1 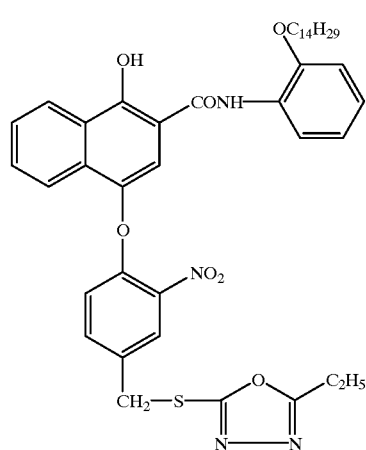
DI-2 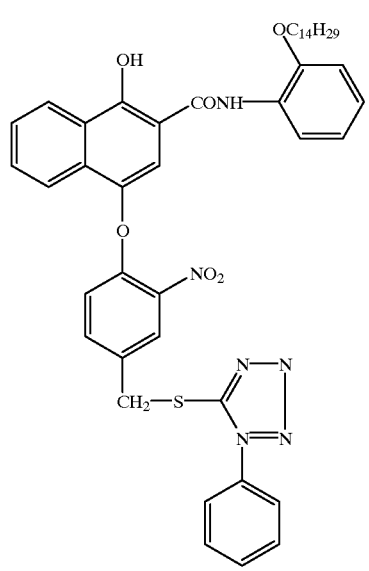
DI-3 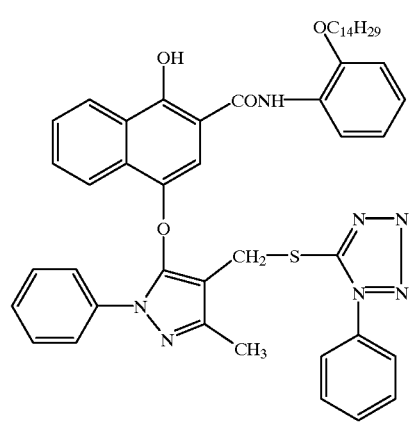
DI-4 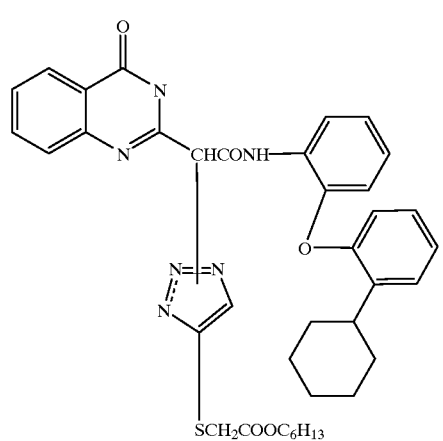
AS-1 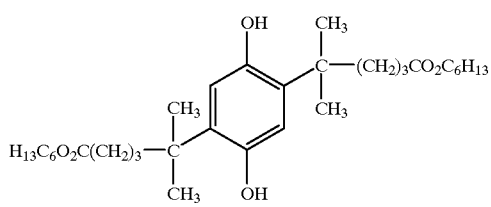
AS-2 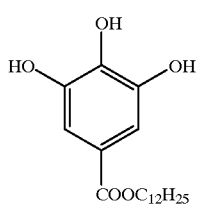

TABLE 1-continued
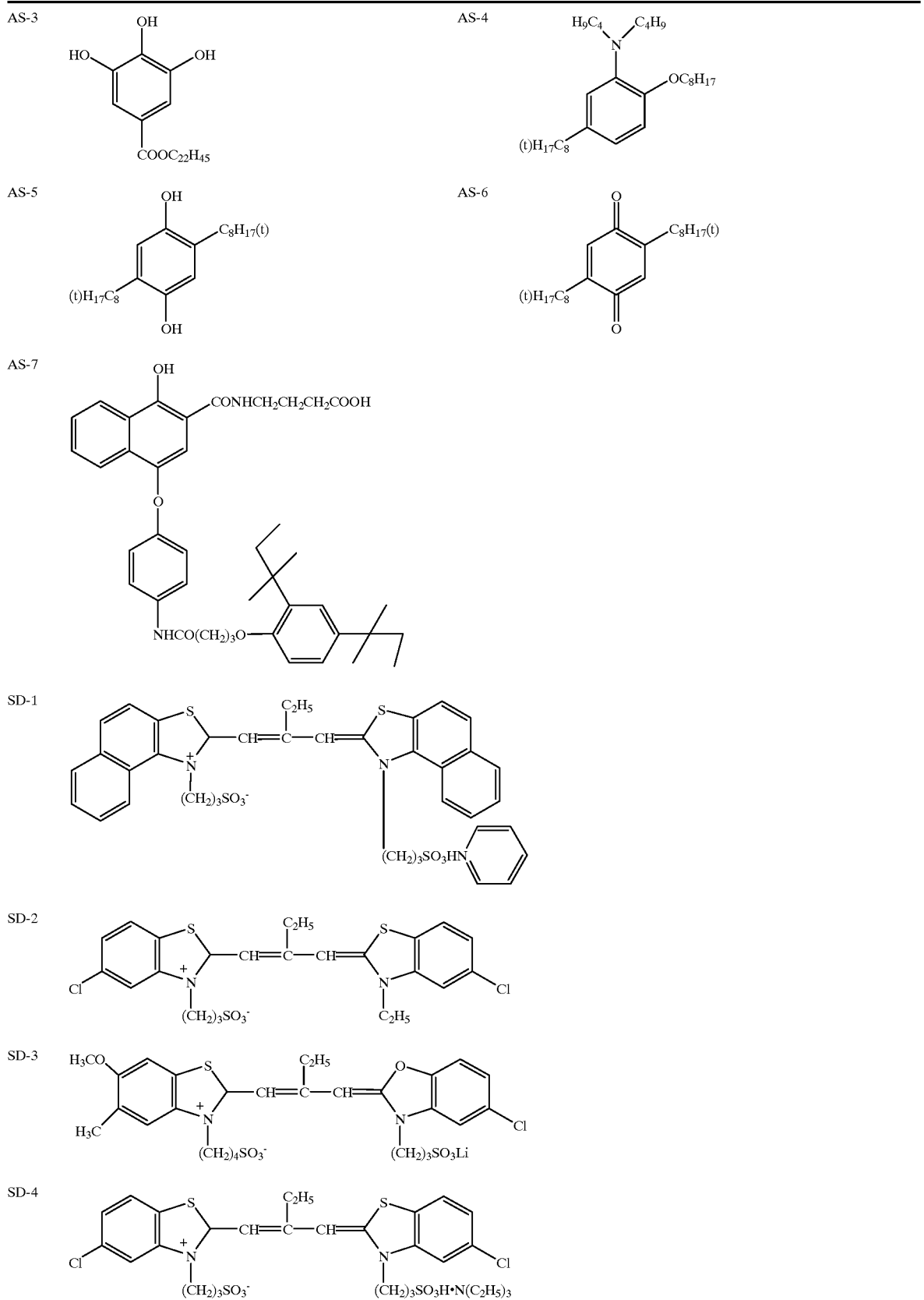

TABLE 1-continued

SD-5: [structure showing benzoxazole dimer with H₃C, Cl substituents, C₂H₅ bridge, (CH₂)₄SO₃⁻ and (CH₂)₃SO₃H·N(C₂H₅)₃ groups]

SD-6: [structure showing benzimidazole dimer with C₂H₅, NC substituents, CH=CH—CH= bridge, (CH₂)₃SO₃⁻ and (CH₂)₃SO₃Na groups, Na substituent]

SD-7: [structure showing phenyl-benzoxazole with C₂H₅ bridge to Cl-benzoxazole, (CH₂)₂SO₃⁻ and (CH₂)₃SO₃H·NEt₃ groups]

SD-8: [structure showing naphth-oxazole dimer with C₂H₅ bridge, (CH₂)₃SO₃⁻ and (CH₂)₃SO₃H·NEt₃ groups]

SD-9: [structure showing phenyl-benzoxazole linked to benzothiazole with CN, CH₃ substituents, C₂H₅ bridge, (CH₂)₂SO₃⁻ and (CH₂)₃SO₃K groups]

SD-10: [structure showing naphtho-thiazole linked to OCH₃-benzothiazole via CH= bridge, (CH₂)₂SO₃⁻ and (CH₂)₃SO₃H·NEt₃ groups]

SD-11: [structure showing phenyl-benzoxazole dimer with CH= bridge, (CH₂)₃SO₃⁻ and (CH₂)₃SO₃Na groups]

ST-1: [structure showing triazolopyrimidine with OH, H₃C substituents]

ST-2: [structure showing adenine: purine with NH₂]

AF-1,2: [structure of polyvinylpyrrolidone: —CH—CH₂— with pyrrolidinone, n repeat]
AF-1 Mw = 10,000

AF-3: [structure of 1-phenyl-5-mercaptotetrazole with SH group]

TABLE 1-continued
AF-2 Mw = 1,100,000
n: Polymerizing degree
AF-4 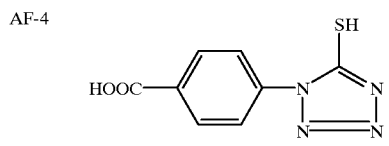
AF-5 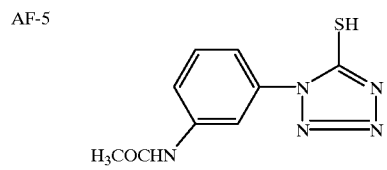
SU-1 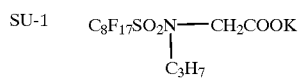
SU-2 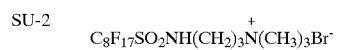
SU-3 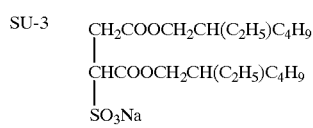
SU-4 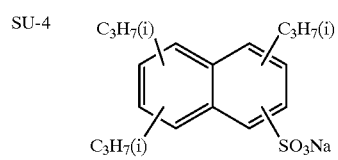
WAX-1 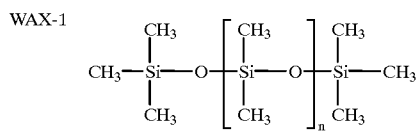
Mw = 3,000
D-1 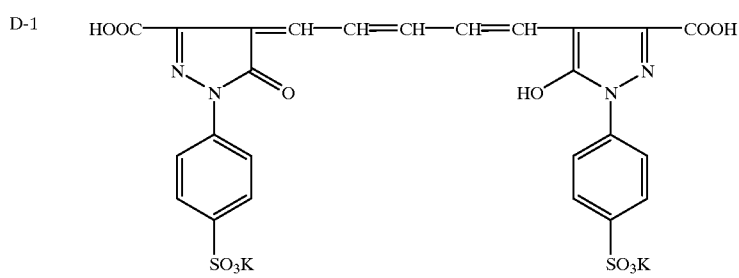
PM-1 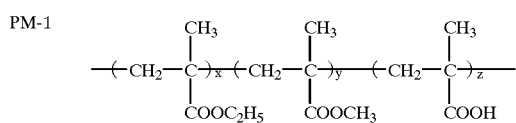
x:y:z = 3:3:4
PM-2 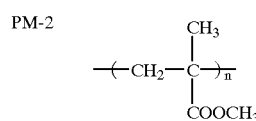
n: Polymerizing degree
OIL-1 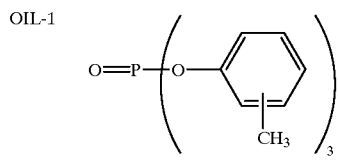
OIL-2 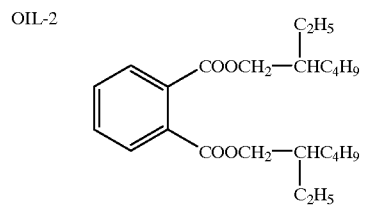
UV-1 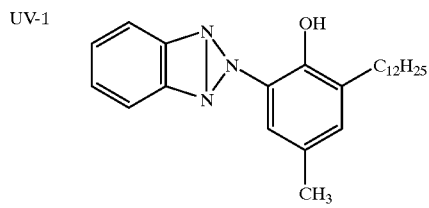
UV-2 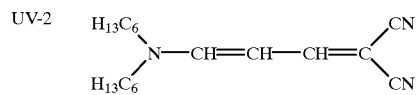

TABLE 1-continued

V-1

$$-\!\!\!\left[\mathrm{CH_2-CH}\right]_n\!\!\!-$$

with phenyl-SO$_3$Na substituent n: Polymerizing degree

Ase-1(Mixture of the following components)

[Three isothiazolone structures: 5-chloro-2-methyl-isothiazol-3(2H)-one, 2-methyl-isothiazol-3(2H)-one, and 4,5-dichloro-2-methyl-isothiazol-3(2H)-one]

A:B:C = 50:46:4(molar ratio)

H-1    [(CH$_2$CH—SO$_2$CH$_2$)$_3$—C—CH$_2$—SO$_2$CH$_2$CH$_2$$\frac{1}{2}$NCH$_2$CH$_2$SO$_3$ H-2    [Triazine structure: 2-ONa-4,6-dichloro-1,3,5-triazine]

As preparation examples of silver halide emulsion preferably used in the invention, preparation of silver iodobromides d and f are shown as below.

Preparation of Seed grain Emulsion-1

To Solution A1 maintained at 42° C., an aqueous silver nitrate solution (1.161 mol) and an aqueous solution of potassium bromide and potassium iodide (potassium iodide of 2 mol %) were added for 2 min. to form nucleus grains, with stirring by a mixer described in Japanese Patent 58-58288 and 58-58299 to form nuclear grains, while silver potential being kept at 0 mV using a silver-ion selection electrode with a saturated silver-silver chloride reference electrode. After the course of a temperature-increase of 42 to 60° C. for 60 min., the pH was adjusted to 6 with 3% KOH aqueous solution. and an aqueous silver nitrate solution (5.902 mol) and an aqueous solution of potassium bromide and potassium iodide (potassium iodide of 2 mol %) were added for 42 min. by double jet precipitation method, while a silver potential being kept at 9 mV. The resulting emulsion was desalted, with decreasing its temperature to 40° C. to obtain a seed emulsion-1.

According to electronmicroscopic observation, the emulsion was proved to be comprised of hexagonal tabular grains accounting for 90% of the projected area of total grains and having a maximum adjacent edge ratio of 1.0 to 2.0, an average diameter (sphere equivalent diameter) of 0.24 μm, and an average aspect ratio of 4.8.

Solution A1

| | |
|---|---|
| Ossein gelatin | 24.2 g |
| Potassium bromide | 10.8 g |
| HO(CH$_2$CH$_2$O)$_m$(CH(CH$_3$)CH$_2$O)$_{19.8}$(CH$_2$CH$_2$O)$_n$H (m + n = 9.77) (10% ethanol solution) | 6.78 ml |
| 10% Nitric acid | 114 ml |
| H$_2$O | 9657 ml |

Preparation of Fine Silver Iodide Grain Emulsion SMC-1

To 5 liters of a 6 wt % gelatin solution containing potassium iodide of 0.06 mol with vigorously stirring, an aqueous solution of 7.06 mol silver nitrate and aqueous solution of 7.06 mol potassium iodide, each 2 liters were added for 10 min, while being kept at a pH of 2.0 and temperature of 40° C. The resulting emulsion (SMC-1) was comprised of fine silver iodide grains having an average size of 0.05 μm.

Preparation Silver Iodobromide Emulsion d 700 ml of a 4.5 wt % inert gelatin aqueous solution containing the seed emulsion-1 (0.178 mol equivalent) and 0.5 ml of ethanol solution of 10% polyisoprene-polyethylene-disuccinic acid ester sodium salt was maintained at 75° C. and the pAg and pH were adjusted to 9.0 and 5.0, respectively. Thereafter, grain formation was carried out by double jet method with vigorously stirring according to the following sequence.

1) An aqueous solution of silver nitrate (2.1 mol), 0.297 mol of SMC-1 and an aqueous potassium bromide solution were added, while being kept at pAg of 8.4 and pH of 5.0.

2) Subsequently, the temperature of the solution was lowered to 60° C. and the pAg was adjusted to 9.8. Thereafter, 0.071 mol of SMC-1 was added and ripening was further carried out for 2 min. (Introduction of dislocation lines)

3) An aqueous solution of silver nitrate (0.959 mol), 0.030 mol of SMC-1 and aqueous solution of potassium bromide were added, while being kept at pAg of 9.8 and pH of 5.0.

During the course of grain formation, each solution was added at an optimal flowing rate not so as to cause nucleation and Ostwald ripening to occur. After completing the addition, desalting was carried out by a conventional flocculation method and after adding gelatin thereto, the pAg and pH were each adjusted to 8.1 and 5.8, respectively.

The resulting emulsion was proved to be comprised of tabular grains having an average cube-equivalent edge length of 0.75 μm, an average aspect ratio of 5.0 and a halide composition of 2/8.5/X/3 mol % of iodide (X: position of introduced dislocation lines). According to the electron micrograph, there was observed not less than 60% of the total grain projected area was accounted for by grains having 5 of more dislocation lines in each of the fringe portion and the inner portion thereof. The iodide content of the grain surface was 6.7 mol %.

Preparation of Silver Iodobromide Emulsion f

A silver iodobromide f was prepared in the same manner as in silver iodobromide d, except that, in the step of 1), the pAg was 8.8 and in the step of 3), silver nitrate and SMC-1 to be added were 0.92 mol and 0.069 mol, respectively.

The resulting emulsion was proved to be comprised of tabular grains having an average cube-equivalent edge length of 0.65 μm, an average aspect ratio of 6.5 and a halide composition of 2/3.5/X/7 mol % of iodide (X: position of introduced dislocation lines). According to the electron micrograph, there was observed not less than 60% of the total grain projected area was accounted for by grains having 5 of more dislocation lines in each of the fringe portion and the inner portion thereof. The iodide content of the surface was 11.9 mol %.

Each of the above emulsions was ripened by adding afore-described sensitizing dyes and further subjected to chemical sensitization by adding triphosphine selenide, sodium. thiosulfate, chloroauric acid and potassium thiocyanate so as to meet an optimal sensitivity and fog relationship.

Silver iodobromide emulsions a, b, c, e, g, h, i, and j were also spectrally and chemically sensitized.

Samples 102 to 109 were prepared in the same manner as Sample 101, except that the acetyl value of diacetylcellulose of the magnetic recording layer, the coating amount of wax of the wax layer (mg/m$^2$) and a solvent for the wax were each varied as shown in Table 2. The contact angle of each sample for water was also shown. In the Table, "W", "MeOH", "TOL" and "MEK" are referred to as water, methanol, toluene and methylethylketone, respectively. A wax solution in TOL/MEK system was prepared in the following manner.

To a mixture solution of 70 parts by weigh of toluene and 30 parts by weight of methylethylketone at 60° C. was added 0.09 parts by weight of carnauba wax with stirring further for 30 min. to prepare a solution. Subsequently, the temperature was kept at 35° C. to obtain a coating solution.

TABLE 2

| Sample No. | Acety value of DAC | Wax amount | Wax solvent | Contact angle (°) |
|---|---|---|---|---|
| 101 | 2.0 | 15 | W/MeoH | 90 |
| 102 | 1.6 | 15 | W/MeOH | 85 |
| 103 | 2.6 | 15 | W/MeOH | 85 |
| 104 | 2.0 | 10 | W/MeOH | 80 |
| 105 | 2.0 | 20 | W/MeOH | 100 |
| 106 | 2.0 | 25 | W/MeOH | 105 |
| 107 | 2.0 | 15 | TOL/MEK | 85 |
| 108 | 1.6 | 10 | TOL/MEK | 75 |
| 109 | 2.0 | 0 | — | 60 |

Unexposed Samples 101 to 109 were each evaluated with respect to clogging of the magnetic head. Furthermore, samples were exposed and processed. Processed samples were also evaluated with respect to the clogging of the magnetic head. Results thereof are summarized in Table 3.

Processing

| Processing step | Time | | Temperature | Replenishing rate* |
|---|---|---|---|---|
| Color developing | 3 min. | 15 sec. | 38 ± 0.3° C. | 780 ml |
| Bleaching | | 45 sec. | 38 ± 2.0° C. | 150 ml |
| Fixing | 1 min. | 30 sec. | 38 ± 2.0° C. | 830 ml |
| Stabilizing | | 60 sec. | 38 ± 5.0° C. | 830 ml |
| Drying | 1 min. | | 55 ± 5.0° C. | — |

*Amounts per m$^2$ of photographic material

A color developer, bleach, fixer and stabilizer each were prepared according to the following formulas.

Color Developer and Replenisher Thereof

| | Worker | Replenisher |
|---|---|---|
| Water | 800 ml | 800 ml |
| Potassium carbonate | 30 g | 35 g |
| Sodium hydrogen carbonate | 2.5 g | 3.0 g |
| Potassium sulfite | 3.0 g | 5.0 g |
| Sodium bromide | 1.3 g | 0.4 g |
| Potassium iodide | 1.2 mg | — |
| Hydroxylamine sulfate | 2.5 g | 3.1 g |
| Sodium chloride | 0.6 g | — |
| 4-Amino-3-methyl-N-(β-hydroxyethyl)-aniline sulfate | 4.5 g | 6.3 g |
| Diethylenetriaminepentaacetic acid | 3.0 g | 3.0 g |
| Potassium hydroxide | 1.2 g | 2.0 g |

Water was added to make 1 liter in total, and the pH of the developer and replenisher thereof were each adjusted to 10.06 and 10.18, respectively with potassium hydroxide and sulfuric acid.

Bleach and Replenisher Thereof

| | Worker | Replenisher |
|---|---|---|
| Water | 700 ml | 700 ml |
| Ammonium iron (III) 1,3-diamino-propanetetraacetic acid | 125 g | 175 g |
| Ethylenediaminetetraacetic acid | 2 g | 2 g |
| Sodium nitrate | 40 g | 50 g |
| Ammonium bromide | 150 g | 200 g |
| Glacial acetic acid | 40 g | 56 g |

Water was added to make 1 liter in total and the pH of the bleach and replenisher thereof were adjusted to 4.4 and 4.0, respectively, with ammoniacal water or glacial acetic acid.

Fixer and Replenisher Thereof

| | Worker | Replenisher |
|---|---|---|
| Water | 800 ml | 800 ml |
| Ammonium thiocyanate | 120 g | 150 g |
| Ammonium thiosulfate | 150 g | 180 g |
| Sodium sulfite | 15 g | 20 g |
| Ethylenediaminetetraacetic acid | 2 g | 2 g |

Water was added to make 1 liter in total and the pH of the fixer and replenisher thereof were adjusted to 6.2 and 6.5, respectively, with ammoniacal water or glacial acetic acid.

Stabilizer and Replenisher Thereof

| | | |
|---|---|---|
| Water | | 900 ml |
| p-Octylphenol/ethyleneoxide (10 mol) adduct | | 2.0 g |
| Dimethylolurea | | 0.5 g |

-continued

| | |
|---|---|
| Hexamethylenetetramine | 0.2 g |
| 1,2-benzoisothiazoline-3-one | 0.1 g |
| Siloxane (L-77, product by UCC) | 0.1 g |
| Ammoniacal water | 0.5 ml |

Water was added to make 1 liter in total and the pH thereof was adjusted to 8.5 with ammoniacal water or sulfuric acid (50%).

Evaluation of Clogging of the Magnetic Head

The magnetic recording medium was cut in width of 1 inch and length of 100 m, a square wave signal of 6 kHz was recorded with a magnetic write head at a speed of 100 mm/sec. and wound in a real.

Next, the square wave signal was read with a read head. and the point at which an output was lowered by 3 dB less than the initial value was referred to as head-clog occurring point. The occurrence level of the head-clog was evaluated in terms of the length (m) from the test start. The less value (i.e., the head-clog occurs at a shorter distance) is more non-preferable. The samples which was, after magnetic recording, exposed and processed, was referred to as "processed".

TABLE 3

| Sample No. | Unprocessed | Processed | Remarks |
|---|---|---|---|
| 101 | ≧500 | 410 | Inv. |
| 102 | 392 | 323 | Inv. |
| 103 | 465 | 347 | Inv. |
| 104 | 303 | 134 | Comp. |
| 105 | 487 | 356 | Inv. |
| 106 | 291 | 118 | Comp. |
| 107 | 498 | 395 | Inv. |
| 108 | 276 | 61 | Comp. |
| 109 | 270 | 23 | Comp. |

As can be seen from the Table, samples with the contact angle for water which fall with the range of the present invention were little in occurrence of head-clog (clogging in the head). It was also shown that samples which fall within a preferred range of the invention with respect to the acetyl value of the magnetic recording layer, the wax amount of the wax layer and kind of wax solvent, exhibited more preferable characteristics.

EXAMPLE 2

Samples 202 to 208 were prepared in the same manner as in Sample 101, except that the amount of alumina as non-magnetic metal oxide particles (mg/m$^2$) and the drying condition after coating the magnetic recording layer were varied as shown in Table 4. Localization of the alumina was measured by observing the cross-section of the magnetic recording layer. The localization was measure in term of percentage of the alumina localized in a portion in a depth from the surface of 30% of the total thickness.

TABLE 4

| Sample No. | Alumina (mg/m$^2$) | Drying condition | Localization (%) | Contact angle (°) |
|---|---|---|---|---|
| 101 | 22 | Conv. | 30 | 90 |
| 202 | 16 | Conv. | 30 | 90 |
| 203 | 10 | Conv. | 30 | 95 |
| 204 | 40 | Conv. | 30 | 85 |
| 205 | 22 | Rapid. | 40 | 95 |
| 206 | 16 | Rapid. | 50 | 95 |

TABLE 4-continued

| Sample No. | Alumina (mg/m$^2$) | Drying condition | Localization (%) | Contact angle (°) |
|---|---|---|---|---|
| 207 | 10 | Rapid. | 45 | 95 |
| 208 | 40 | Rapid. | 35 | 85 |

The drying condition was as follows.

Conventional Drying Condition

After coating, samples each were dried at a temperature 25° C., 20% RH and air-flowing speed of 0.1 m/sec. for 10 sec.; then, at 60° C., 10% RH and an air-flowing speed of 2 m/sec. for 8 sec. and further at 110° C. for 2 sec.

Rapid Drying Condition

After coating, samples each were dried a temperature of 60° C., 10% RH and an air-flowing speed of 8 m/sec. for 8 sec. and then at 110° C. for 2 sec.

In Table 4, the expression, "Conv." and "Rapid." are referred to as the above conventional drying condition and rapid drying condition, respectively. Samples 101 and 202 to 208 were evaluated with respect to clogging of the magnetic head in the same manner as in Example 1. results thereof are shown in Table 5.

TABLE 5

| Sample No. | Unprocessed | Processed |
|---|---|---|
| 101 | ≧500 | 410 |
| 202 | ≧500 | 423 |
| 203 | ≧500 | 419 |
| 204 | 479 | 387 |
| 205 | ≧500 | 435 |
| 206 | ≧500 | 446 |
| 207 | ≧500 | 438 |
| 208 | 480 | 390 |

As can be seen from Table 5, samples in which non-magnetic metal oxide particles were localized in the vicinity of the surface of the magnetic recording layer were shown to be little in occurence of the head-clog. Samples which fall within the range of the invention regarding the amount of the non-magnetic metal oxide particles and the drying condition of a coated magnetic recording layer, exhibited more preferred characteristics.

EXAMPLE 3

Sample 301 was prepared in the same manner as Sample 101, except that magnetic particles and non-magnetic metal oxide particles each were separately dispersed and then mixed with each other.

Sample 301 was evaluated with respect to clogging of the magnetic head. As a result, sample 301 led to improvements in the head-clog of 457 m, as compared to 410 of Sample 101.

EXAMPLE 4

Samples 402 to 409 were prepared in the same manner as Sample 1-1, except that addition amounts (% of the weight of the binder) of a isocyanate type hardener, "Coronate-3041" (tri-functional type) used in Sample 101 and hardener, "Coronate EH" (di-functional type), and an adding method thereof (i.e., through batchwise or in-line addition) were changed, as shown in Table 6. In the Table, the expression, "Di" and "Tri" are referred to as the difunctional type hardener and tri-functional type hardeners; and "Batch" and "Inline", referred to as batchwise addition and in-line addition, respectively.

TABLE 6

| Sample No. | Hardenner | Amount | Adding method |
|---|---|---|---|
| 101 | Tri | 15 | Batch |
| 402 | Tri | 20 | Batch |
| 403 | Tri | 10 | Batch |
| 404 | Di | 15 | Inline |
| 405 | Di | 20 | Inline |
| 406 | Tri | 10 | Inline |
| 407 | Tri | 15 | Inline |
| 408 | Tri | 20 | Inline |
| 409 | Tri | 30 | Inline |

Samples 101 and 402 to 409 were evaluated with respect to clogging of the magnetic head. Results thereof are shown in Table 7.

TABLE 7

| Sample No. | Processed |
|---|---|
| 101 | 410 |
| 402 | 447 |
| 403 | 378 |
| 404 | 389 |
| 405 | 388 |
| 406 | 423 |
| 407 | 465 |
| 408 | 482 |
| 409 | 485 |

As can be seen from Table 10, when the tri-functional isocyanate hardener was added in-line, in an amount of 15 to 30% by weight, more preferable characteristics were achieved.

EXAMPLE 5

Sample 501 was prepared in the same manner as Sample 101, except that magnetic particles and non-magnetic metal oxide particles each were separately dispersed, the isocyanate type hardener was added in-line, in an amount of 20% by weight of the total binder and a coated magnetic recording layer was subjected to the rapid drying. Sample 501 was evaluated with respect to clogging of the magnetic head in the same manner as in Example 1. As a result, it was proved that the head-clog of Sample 501 occurred at not less than 500 m.

What is claimed is:

1. A magnetic recording medium comprising a support with first and second sides, said support having on said first side a magnetic recording layer containing a magnetic powder and on said second side photographic component layers including a silver halide emulsion layer, wherein a contact angle between water and a surface of said first side of the magnetic recording medium is from 85° to 100°, said surface of said first side having a surface layer containing wax in an amount of 12 to 20 mg/m$^2$, and said magnetic recording layer containing an acetylcellulose as a binder, said acetyl cellulose having an acetyl value of 1.8 to 2.3; said magnetic recording medium being prepared by a process comprising:

(i) coating a coating solution for the magnetic recording layer on the support, (ii) drying a coated magnetic recording layer, (iii) dissolving said wax in a mixture of water and an alcohol selected from the group consisting of methanol, ethanol, n-propanol, isopropanol, n-butanol, isobutanol, tert-butanol, ethylene glycol monomethyl ether, and propylene glycol monomethyl ether;

(iv) coating a coating solution containing said wax on said magnetic recording layer to form a wax layer, and (v) drying said wax layer.

2. The magnetic recording medium of claim 1, wherein said magnetic recording layer contains non-magnetic metal oxide particles in an amount of 2 to 30 mg/m$^2$.

3. The magnetic recording medium of claim 2, wherein said non-magnetic metal oxide particles are localized in the vicinity of the surface of the magnetic recording layer.

4. The magnetic recording medium of claim 1, wherein said magnetic recording layer is hardened by adding an isocyanate compound in an amount of 15 to 30% by weight based on a binder contained in the magnetic recording layer.

5. The magnetic recording medium of claim 1, wherein said photographic component layers comprise a blue-sensitive silver halide emulsion layer, a green-sensitive silver halide emulsion layer and a red-sensitive silver halide emulsion layer.

6. The magnetic recording medium of claim 1, wherein, in the step of (ii), drying is completed within 15 sec.

7. The magnetic recording medium of claim 1, wherein said coating solution for the magnetic recording layer is prepared in such a manner that the magnetic powder and non-magnetic metal oxide particles are each separately dispersed in a dispersing medium and then mixed with each other.

8. The magnetic recording medium of claim 1, wherein, immediately before coating of (i), a hardening agent of a isocyanate compound is incorporated in said coating solution through in-line addition.

* * * * *